Figure 3:
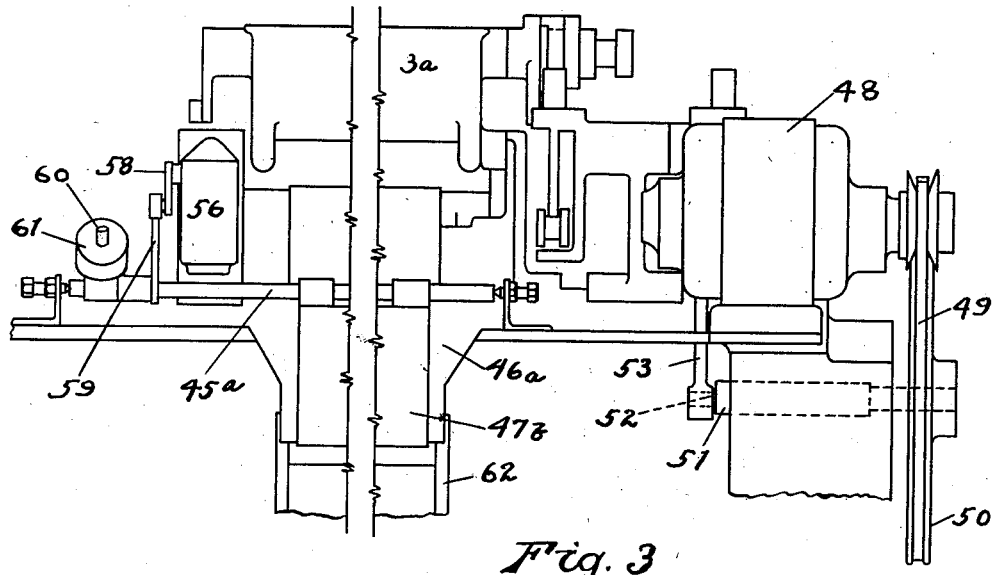

Jan. 3, 1939. E. W. PLAMBECK 2,142,373
ARTICLE CONTROLLED DUSTER
Filed Dec. 19, 1936 2 Sheets-Sheet 1
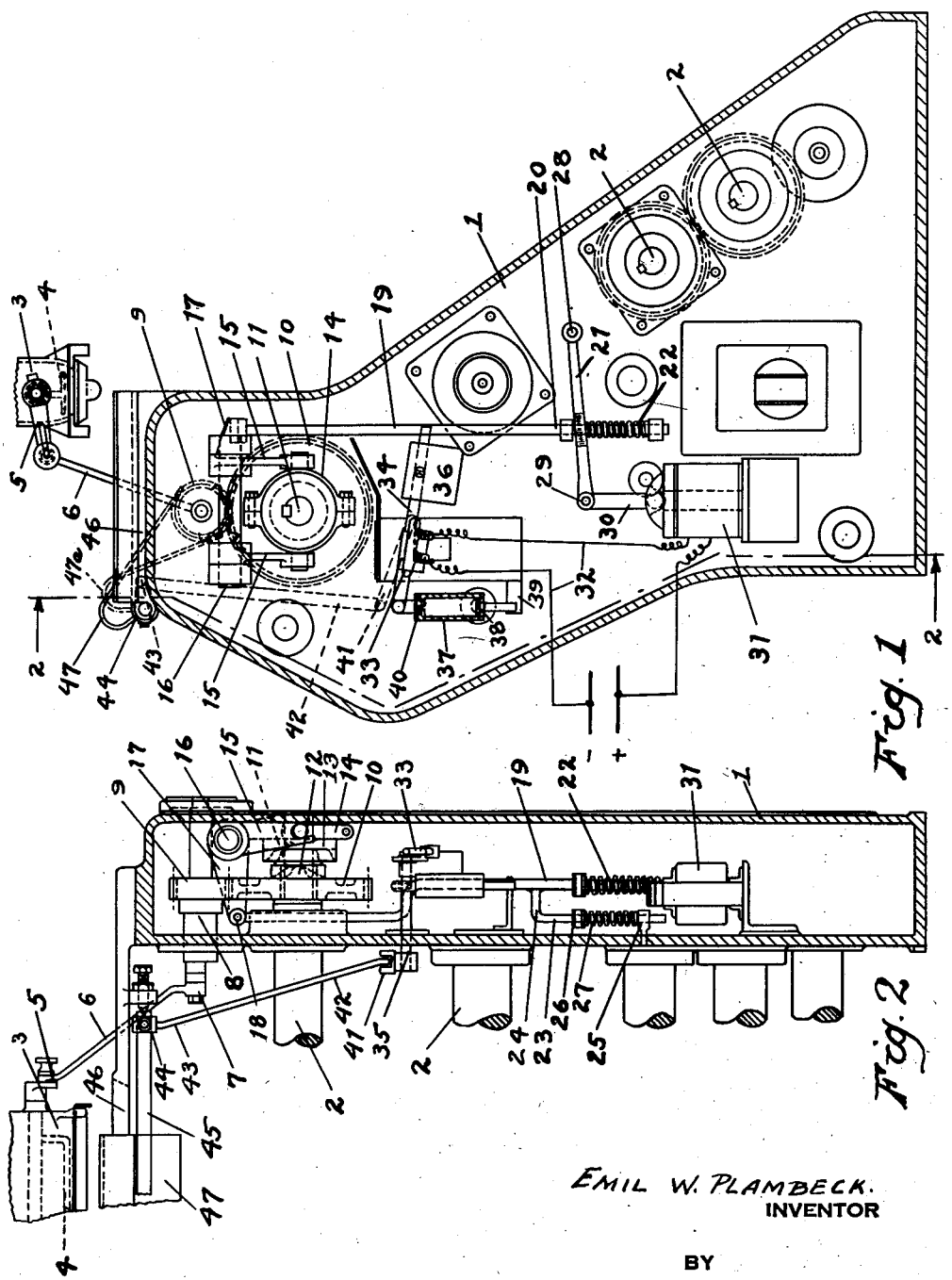
EMIL W. PLAMBECK.
INVENTOR
BY
Elmer W. Vipond, ATTORNEY Jan. 3, 1939. E. W. PLAMBECK 2,142,373
ARTICLE CONTROLLED DUSTER
Filed Dec. 19, 1936 2 Sheets-Sheet 2

EMIL W. PLAMBECK,
INVENTOR

BY
Elmer W. Vipond, ATTORNEY

UNITED STATES PATENT OFFICE 2,142,373

ARTICLE CONTROLLED DUSTER

Emil W. Plambeck, Saginaw, Mich., assignor, by mesne assignments, to Baker Perkins Company, Inc., Saginaw, Mich., a corporation of New York Application December 19, 1936, Serial No. 116,731

8 Claims. (Cl. 107—7)

This invention relates to a control apparatus for machines which performs a certain operation upon an article fed continuously through the machine, and wherein, the operation performed is controlled by the article.

As a specific illustrative embodiment of this invention, the molding head of a dough molding machine may be considered wherein lumps of dough are fed continuously, in spaced relation, through a series of flattening rolls which flatten the lumps of dough into a sheet and then coils the sheet into a molded loaf after which the coiled loaf is sealed by moving pressure means such as a revolving drum and pressure board or a moving belt and stationary table, all of which are well known in the baking art.

During the sheeting and coiling operation, the dough pieces are dusted with flour to prevent them from sticking to the molding rolls and parts which completely form the loaf.

In prior machines of this type, the flour duster is operated from some moving part of the machine so that the flour is dusted continuously upon the rolls and upon the pieces of dough. It quite often happens that one or more pieces of dough are missing from the line or conveyor which feeds the dough pieces to the molder and, consequently, the dusting flour which would ordinarily be taken up by the missing dough pieces, is deposited in the molder. When the next succeeding lump of dough enters the molder, this excess flour is collected and rolled and pressed into the dough loaf so that when the baked loaf of bread is sliced, hard undesirable lumps are found, and the lines defining the coil of the dough piece are plainly discernible.

It is an object of my present invention to overcome these difficulties by providing a flour duster whose operation is controlled by the piece of dough as it enters the machine.

Machines are known in which certain operations are performed on an article and the articles control the operation performed, but in such devices the articles are fed into the machine in a continuous stream without a gap between them. In bakeries, however, it is necessary to keep the dough pieces separated a considerable distance from each other in order that they will not touch and adhere or join one another to form a double loaf.

If the principles of known article controlled operations were applied to dough molding machines, the constant stopping and starting of the flour sifter, due to the space between successive dough pieces, would soon cause excessive wear and breakage. It is, therefore, a further object of my invention to provide a device of the class described wherein dough pieces are fed continuously, in spaced relation, past a flour duster and where the flour duster will operate continuously so long as this predetermined spaced relation exists, but will stop the flour duster in the event the space between the dough pieces is increased beyond the predetermined distance. In other words, the flour dusters will stop whenever one or more dough pieces are missing.

Furthermore, in prior machines, whenever there was a stoppage of the machines, operating upon the dough, which preceeded the molding operation, the flour duster continued to run until the operator noticed that no dough pieces were passing through the molder, and unless the flour duster was manually disconnected from its operating mechanism, the flour continued to run into the molding machine to fill up the molding channels, or spill upon the floor. If the molding channel was filled with flour, this generally had to be cleaned out before any dough pieces could pass through the sealing device.

It is therefore, a still further object of my invention to provide a machine in which the flour duster will be automatically disconnected from its operating parts as soon as a break, which is longer than the predetermined spacing, occurs, and which will again be automatically put into operation as soon as the dough pieces are again fed into the molding machine, thus eliminating the constant attention of the operator.

It is a still further object of my invention to provide a machine which is positive in operation which will assure the correct amount of dusting flour for each dough piece thereby saving dusting flour and which is simple in construction.

The objects of my invention are carried out by means of a trip mechanism, actuated by the dough pieces, which will automatically connect the flour dusting means to its operating mechanism and remain connected for a predetermined length of time after the dough piece has passed from the trip mechanism and so long as the dough pieces are traveling through the machine in predetermined spaced relation but which will permit the flour duster to become disconnected from its operating mechanism if the space becomes greater than that which has been established by predetermination.

With these and certain other objects in view which will appear later in the specification, my invention comprises the devices described and claimed and the equivalents thereof.

Referring now to the drawings—

Figure 4:
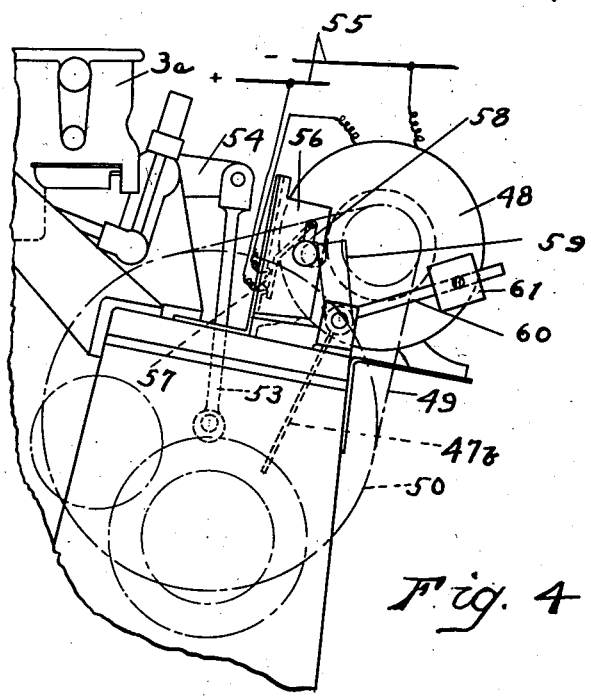

Figure 1 is a side elevational view of the molding head of a dough molding machine broken away in parts to show an illustrative embodiment of the invention. Figure 2 is a longitudinal section taken along the line 2—2 of Figure 1. Figure 3 is a rear view broken away in parts showing an alternative form of my invention. Figure 4 is a side elevation of the parts shown in Figure 3.

In the drawings, 1 is the frame of a molding head of a dough molding machine having the usual molding rolls, (not shown) which sheet and coil the dough pieces into a loaf of dough. The molding rolls are mounted on shafts 2—2 which are driven in unison by chains, gears, etc. from a motive power as is usual with this type of machine, therefore the drive is not shown. Located above the molding rolls is a flour duster 3 arranged to direct a shower of flour upon the dough pieces as they pass through the molding rolls, and also upon the rolls themselves. The agitator 4 of the flour duster 3 is operated by the usual crank 5 connected by a bar 6 to an eccentric 7 upon an eccentric shaft 8. Fixed to the eccentric shaft 8 is a pinion 9 meshing with a drive gear 10 loosely mounted on an extension 11 of one of the molding roll shafts 2 which, being constantly driven, provides the motive power for the duster. Secured to the face of this drive gear 10 and rotatable therewith, is the male-half 12 of a clutch member, the female or driving half 13 being slidingly keyed to the molding roll shaft extension 11 and continuously rotated therewith. The female half 13 of this clutch member has the usual non-rotatable shifting yoke 14 loosely fitted in an annular recess in the clutch so that the clutch will rotate freely in the yoke. The yoke 14 is connected by shifting links 15 secured to a clutch rock shaft 16 having attached at one end, thereof, a clutch crank 17, so that when the clutch crank 17 is oscillated, the clutch members are caused to engage and disengage with each other.

The clutch crank 17 is pivotally connected, as at 18, to one end of a pull rod 19 whose opposite end 20 passes midway through a pull link 21 and is connected thereto by a resilient means such as a spring 22 so as to avoid clashing of the clutch members when they move into engagement.

Secured to the back-face of the pull rod 19 is an inverted L shaped member 23 (Fig. 2) the shorter portion 24 being welded to the pull rod 19 and the end 24 of the longer portion passing through a guide member 25 secured in the machine frame 1. Between the guide member 25 and a collar 26 fastened on the long portion of the L shaped member 23, is a power spring 27 adapted to exert an upward movement to the pull rod 19 and engage the clutch members.

One end of the pull link 21 is pivoted to the machine frame, as at 28, and the opposite end 29 is connected to the core 30 of a solenoid 31 which is energized from any suitable source of electric current. When the solenoid 31 is energized, the core 30 is drawn downward and through the pull link 21 and pull rod 19 disengages the clutch members 12 and 13 at the same time the power spring 27 on the inverted L shaped member 23 is compressed between the fixed collar 26 and guide member 25 so that when the solenoid is de-energized, the power spring 27 upon expanding, will move the pull rod 19 and through its pivoted connection 18 to the clutch crank 17 oscillate the clutch rock shaft 16, and engage the clutch members.

Inserted in the current supply line 32 is a switch 33 preferably of the mercury type, mounted on a tilting arm 34 which is secured to an oscillatable shaft 35 journaled in the frame of the molding head. One end of the tilting arm 34 is weighted with an adjustable balancing weight 36, while the other end is connected to a dash pot 37 of the usual type having, therein a piston 38 secured to a support 39 fixed on the frame so that the dash pot moves over the piston.

A ball check valve 40 is located in the top of the dash pot so that it may move quickly in one direction and slowly in the opposite direction.

Secured to the opposite end of the rotatable shaft 35 is a crank 41 pivotally connected to one end of a trip link 42 whose opposite end 43 is pivotally connected to a trip lever 44 secured to an oscillatable trip shaft 45 which extends across the machine adjacent a feeding opening 46 to the molding rolls.

Secured on the trip shaft 45 is a trip plate 47 which projects angularly across the feeding opening 46 and in the path of the on-coming dough pieces.

The operation of the machine is as follows:

As dough pieces are fed through the feed opening 46 of the molding head, they contact the trip plate 47 and depress it as shown in dotted lines 47a on the drawings. The depression of the plate oscillates the trip shaft 45 and rocks the trip arm 44 causing the trip rod 42 through its connecting crank 41 to oscillate the shaft 35 and its tilting arm 34 and thus move the dash pot 37 over the piston 38. As the dash pot moves over the piston, the ball check valve 40 is moved upwardly from its seat by the air compressed between the piston and top of the dash pot, causing the dash pot to move easily over the piston.

The oscillation of the tilting arm 34 tips the mercury switch 33 and causes the mercury to flow to the lowermost end which breaks the electric circuit to the solenoid 31. The solenoid now being de-energized, the pull rod 19 is free to move upwardly by the expansion of its power spring 27 and the clutch members are engaged.

The female portion of the clutch member, being rotatable with the molding roll shaft extension 8, now being engaged with the male member 12 of the clutch which is secured to the drive gear 10, causes this gear 10 to rotate, and by its rotation, transmits motion to pinion 9 on the eccentric shaft 7 causing the connecting crank 6 to oscillate the agitator 4 of the flour duster 3.

Flour is now showered upon the molding rolls and the dough piece passing therethrough.

The dough piece now having passed off of the trip plate 47 its return to the initial position, normally caused by the balancing weight 36, is retarded by the dash pot 37. As the dash pot moves upwardly, the ball check 40 is drawn firmly upon its seat and the slow leakage of air past the ball and piston causes the dash pot to move very slowly. Before the dash pot can move far enough to tip the mercury switch 33 and permit the liquid therein to flow and form an electrical connection, the next succeeding dough piece has contacted the trip plate and again caused the dash pot to move downwardly over the piston and thus maintain the mercury switch in its tilted position to keep the circuit broken to the solenoid.

This condition will be maintained so long as dough pieces are fed into the machine in predetermined regularly spaced relation; but as soon as this spacing is increased beyond a predetermined length, the trip plate can return to its initial position, and consequently, through its connecting parts, the mercury switch will be tilted sufficiently to cause the mercury to make contact and energize the solenoid, thereby disengaging the clutch members and stopping the flour duster.

The speed with which the dash pot moves upwardly over the piston is regulated by the adjustment of the balancing weight 36. When the balancing weight is moved outwardly towards the end of tilting arm 34, the dash pot will move upwardly over its piston much faster than when the weight is moved inwardly towards the pivotal point of the arm. Thus the means for keeping the flour duster in operation may be adjusted according to the distance between the dough pieces fed into the molding machine.

Referring now to Figures 3 and 4: I have shown an alternative form of my invention consisting of a flour duster 3a driven directly from a small motor 48 by means of a belt 49 and pulley 50. On the shaft 51 of the driven pulley 50 is an eccentric 52 connected by an eccentric rod 53 to the agitator arm 54 of the flour duster 3a so that when the motor is running, flour is being showered upon the dough pieces and molding rolls. The power lines 55 to the motor 48 pass through a limit switch 56 of any standard design having therein the usual make and break connections 57 and which are operated by a lever 58 on the outside of the limit switch casing. This lever 58 is contacted by a switch operating arm 59 on a trip shaft 45a projecting across the feed opening 46a of the molding head. Projecting angularly downward in the feed opening, is a trip plate 47b secured to a trip shaft 45a and which is contacted by the dough pieces as they are fed into the molding head in spaced relation. The movement of the trip plate 47b oscillates the trip shaft 45a and moves a switch operating arm 59 to rotate the lever 58 and close the circuit from the power lines 55 to the motor 48, thus putting in operation, the flour duster.

Secured to one end of the trip shaft 45a is an arm 60 having a balancing weight 61 slidably mounted thereon. This weight may be adjusted to cause the trip plate to slowly return to its normal position across the feed opening in the molding head.

In operation, as the dough contacts the trip plate, it is moved downwardly and through its connecting parts, closes the limit switch. The motor is thereupon started and flour is dusted upon the dough pieces and the molding rolls 62. As soon as a dough piece has passed off of the trip plate, it slowly returns to normal, breaking the circuit to the power lines; however, the motor is permitted to coast for a short period and flour is showered upon the dough pieces and molding rolls until the next dough piece strikes the trip plate. In this manner, the flour duster is operating continuously so long as the dough pieces are fed in continuous spaced relation; but should the predetermined spacing be increased by the absence of a dough piece, the motor will stop and no more flour will be fed from the duster until another dough piece strikes the trip plate.

While I have shown and described two specific forms of my invention, it is to be understood that my invention can be applied to various types of machines, and that the specific details shown are for illustrative purposes only, as many equivalents could be substituted by any one skilled in the art to which it appertains, without departing from the spirit of my invention.

Having thus described my invention, what I claim and desire to secure by Letters Patent is:

1. In a machine of the class described having mechanisms for forming a loaf of dough as dough pieces are fed in predetermined spaced relation through said forming mechanisms, a flour duster for showering flour upon said dough pieces and upon said forming mechanism, means for agitating said duster, control means actuated by the dough pieces for setting said agitating means in motion, and means for maintaining said agitating means in operation for a predetermined period of time after a dough piece has passed said control means.

2. In a machine of the class described having mechanisms for forming a loaf of dough as dough pieces are fed in predetermined spaced relation through said forming mechanisms, a flour duster for showering flour upon said dough pieces and upon said forming mechanism, power means for operating said duster, control means for said power means actuated by the passage of the dough pieces therethrough for connecting and disconnecting said duster and said power means, and means for maintaining said flour duster in operation for a predetermined time after a dough piece has passed through said control mechanism.

3. In a dough molding machine comprising mechanisms for continuous operating upon dough pieces passing through said machine in predetermined spaced relation, a flour duster adapted to shower flour upon the dough pieces passing therethrough, agitating means for said flour duster, power means to operate said agitating means, a clutch mechanism adapted to engage and disengage said agitating means and said power means, a trip plate operated by the dough pieces and adapted to operate said clutch mechanism, and retarding means to delay the disengagement of said clutch mechanisms for a predetermined period of time after a dough piece has passed said trip plate.

4. In a dough molding machine comprising mechanisms for continuously operating upon dough pieces passing through said machine in predetermined spaced relation, a flour duster adapted to shower flour upon the dough pieces passing through said machine, agitating means for said flour duster, power means to operate said agitating means, a clutch mechanism adapted to engage and disengage said agitating means and said power means, a trip plate operated by the dough pieces and adapted to operate said clutch mechanism, and retarding means associated with said trip plate adapted to delay the disengagement of said clutch mechanisms for a predetermined period of time after a dough piece has passed said trip plate.

5. In a dough molding machine comprising mechanisms for continuous operating upon dough pieces passing through said machine in predetermined spaced relation, a flour duster adapted to shower flour upon the dough pieces passing therethrough, a driving means for said flour duster, a continuous operating power means, a clutch member between said power means and said duster driving means, an operating arm for said clutch member, a trip plate in the path of travel of the dough pieces and adapted to be tripped by said dough pieces as they pass through said machine, a connection between said trip plate and said clutch operating arm, including a dash pot arranged to permit the clutch members to quickly engage but retard their disengagement for a predetermined period of time after a dough piece has passed said trip plate.

6. In a dough molding machine comprising mechanisms for continuously operating on dough pieces passing therethrough, a motor driven flour duster adapted to shower flour on the dough pieces passing therethrough, a power circuit to said motor, a make and break switch in said power circuit, means operated by said dough pieces to close the circuit to said motor, and means to retard the opening of said circuit for a predetermined period of time after a dough piece has passed said dough operated means.

7. In a dough molding machine comprising mechanisms for continuously operating on dough pieces passing therethrough in predetermined spaced relation, a motor driven flour duster adapted to shower flour on the dough pieces passing therethrough, a power circuit to said motor, a make and break switch in said power circuit, a trip plate contacted by said dough pieces, a connection between said trip plate and said power switch to close the circuit to said motor, and means to retard the opening of said circuit for a predetermined period of time after a dough piece has passed through said machine.

8. In a dough molding machine comprising mechanisms for continuously operating on dough pieces passing in predetermined spaced relation, a motor driven flour duster adapted to shower flour on the dough pieces passing therethrough, a power circuit to said motor, a make and break switch in said power circuit, means operated by said dough pieces to close the circuit to said motor, said means adapted to open said circuit after a dough piece has passed said operating means whereby the motor will continue to coast and operate said duster for a period of time after said dough piece has passed said operating means.

EMIL W. PLAMBECK.